(12) United States Patent
Fujiwara et al.

(10) Patent No.: US 11,859,983 B2
(45) Date of Patent: Jan. 2, 2024

(54) LANE INFORMATION GENERATING METHOD

(71) Applicant: PIONEER CORPORATION, Tokyo (JP)

(72) Inventors: Toshiki Fujiwara, Kawagoe (JP); Takuya Tsukada, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 618 days.

(21) Appl. No.: 16/980,801

(22) PCT Filed: Mar. 15, 2018

(86) PCT No.: PCT/JP2018/010192
§ 371 (c)(1),
(2) Date: Sep. 14, 2020

(87) PCT Pub. No.: WO2019/176043
PCT Pub. Date: Sep. 19, 2019

(65) Prior Publication Data
US 2021/0009123 A1    Jan. 14, 2021

(51) Int. Cl.
*G01C 21/28* (2006.01)
*G01C 21/00* (2006.01)
*G06V 20/56* (2022.01)

(52) U.S. Cl.
CPC ......... *G01C 21/28* (2013.01); *G01C 21/3819* (2020.08); *G06V 20/588* (2022.01)

(58) Field of Classification Search
None
See application file for complete search history.

(56) References Cited

U.S. PATENT DOCUMENTS

2003/0069688 A1* 4/2003 Mosis .................. G01C 21/28
                                                    340/988
2011/0172913 A1  7/2011 Nakamura et al.
(Continued)

FOREIGN PATENT DOCUMENTS

CN         107451526 A     12/2017
DE  10 2013 211 696 A1    12/2014
(Continued)

OTHER PUBLICATIONS

Tanaka; Machine translation of JP-2017090649-A; May 2017; espacenet.com (Year: 2017).*

(Continued)

*Primary Examiner* — David P. Merlino
(74) *Attorney, Agent, or Firm* — NIXON & VANDERHYE

(57) ABSTRACT

Disclosed is a lane information generating method that can generate lane information of an increasing or decreasing lane which increases or decreases from a traveling lane with high accuracy is provided. By determining characteristic points based not only on traveling trajectory information of a vehicle but also on the shape of the increasing line of the increasing lane increasing from two traveling lanes, a control unit can complementarily using information of a shape of the increasing line at a position at which variation is easily generated in the traveling trajectory, and thus generate the characteristic points as the lane information of an increasing line with high accuracy.

5 Claims, 5 Drawing Sheets

(56) References Cited

U.S. PATENT DOCUMENTS

| | | | | |
|---|---|---|---|---|
| 2017/0097642 A1* | 4/2017 | Okuya | ................ | G05D 1/0212 |
| 2018/0131924 A1* | 5/2018 | Jung | ................... | H04N 13/204 |
| 2018/0181817 A1* | 6/2018 | Yan | ..................... | G06V 10/764 |
| 2018/0181820 A1* | 6/2018 | Ide | ....................... | B60W 30/143 |
| 2019/0251373 A1* | 8/2019 | Lee | .......................... | G06T 7/50 |
| 2020/0064138 A1* | 2/2020 | Takahama | ........... | G01C 21/3667 |
| 2021/0342603 A1* | 11/2021 | Hori | ........................ | G08G 1/16 |

FOREIGN PATENT DOCUMENTS

| | | |
|---|---|---|
| JP | 2002-318533 | 10/2002 |
| JP | 2005-098853 | 4/2005 |
| JP | 2011-145159 | 7/2011 |
| JP | 2017-500595 | 1/2017 |
| JP | 2017090649 A * | 5/2017 |
| JP | 2017-182563 | 10/2017 |

OTHER PUBLICATIONS

Extended European Search Report issued in European Patent Application No. 18909971.6 dated Oct. 4, 2021.
International Search Report for PCT/JP2018/010192 dated Jun. 19, 2018, 4 pages, with English Translation.
Written Opinion of the ISA for PCT/JP2018/010192 dated Jun. 19, 2018, 4 pages.

* cited by examiner

LANE INFORMATION GENERATING METHOD

CROSS-REFERENCE TO RELATED APPLICATIONS

This application is the U.S. national phase of International Application No. PCT/JP2018/010192 filed Mar. 15, 2018 which designated the U.S., the entire contents of which is hereby incorporated by reference.

TECHNICAL FIELD

This invention relates to a lane information generating method.

BACKGROUND ART

There is conventionally proposed a method to update map data based on a traveling trajectory of a vehicle (mobile object) (for example, refer to Patent Document 1). In an updating method of the map data described in Patent Document 1, a traveling trajectory in a case where map-matching was impossible is used as a new road to update a map data base.

CITATION LIST

Patent Literature

[Patent Document 1]: Japanese Unexamined Patent Application Publication No. 2011-145159

SUMMARY OF THE INVENTION

Technical Problem

When performing a route guidance for a mobile object, it is possible to improve convenience when it can be grasped not only on which road the mobile object is traveling, but also on which lane out of plural lanes constituting the road the mobile object is traveling. For example, if it is grasped on which lane out of a straight travel lane, a right turn lane, and a left turn lane the mobile object is traveling, it is possible to assume a traveling direction of the mobile object, and assumed information can be used for the route guidance.

In order to grasp a lane on which the mobile object is traveling, it is necessary to collect information regarding lanes constituting the road, however, the number of lanes may increase or decrease in the vicinity of an intersection or the like. On a position where the number of lanes increases or decreases, variation is generated in a traveling trajectory of the mobile object since a timing of a lane change of the mobile object greatly varies depending on a driver. Therefore, it was difficult to generate lane information of an increasing or decreasing lane which increases or decreases from a traveling lane based only on the traveling trajectory of the mobile object.

Therefore, an example of the problems to be solved by the present invention is to provide a lane information generating method which can generate lane information of an increasing or decreasing lane which increases or decreases from a traveling lane with high accuracy.

Solution to Problem

In order to solve the problem and to achieve the object aforementioned, a lane information generating method of the present invention defined in claim 1 generating lane information of an increasing or decreasing lane which increases or decreases from a traveling lane based on traveling trajectory information of a mobile object, including: a first acquiring step of acquiring the traveling trajectory information; a second acquiring step of acquiring increasing or decreasing line information of an increasing or decreasing line of the increasing or decreasing lane detected by a sensor arranged in the mobile object; and a generating step of generating the lane information based on the traveling trajectory information and a shape of the increasing or decreasing line.

DESCRIPTION OF EMBODIMENTS

Figure 1:
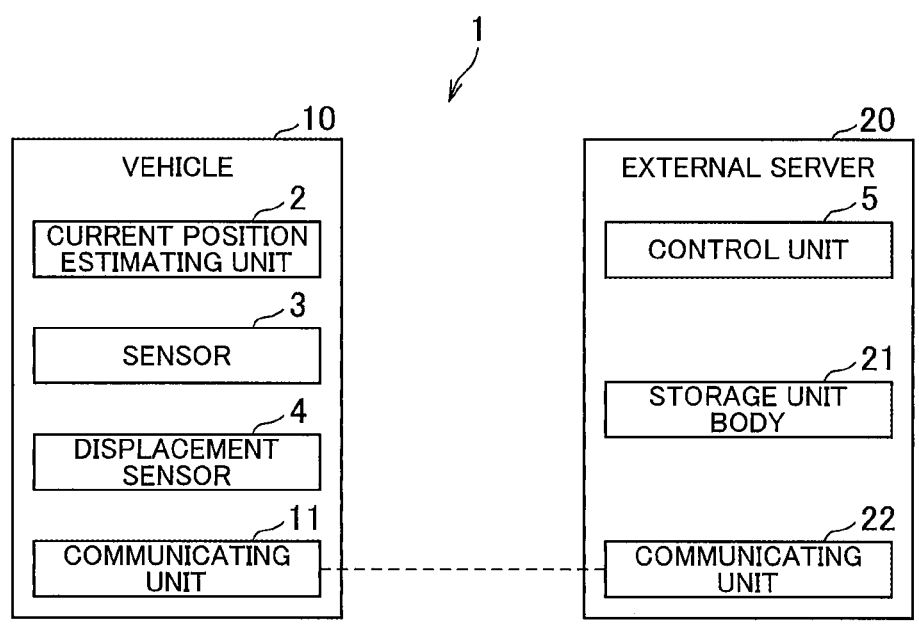
FIG. 1 is a block diagram illustrating a summary of a lane information generating system according to an example of the present invention.

An embodiment of the present invention will be described below. A lane information generating method according to the embodiment of the present invention is a lane information generating method in which lane information of an increasing or decreasing lane which increases or decreases from a traveling lane is generated based on traveling trajectory information of a mobile object and includes a first acquiring step of acquiring the traveling trajectory information, a second acquiring step of acquiring increasing or decreasing line information of an increasing or decreasing line of the increasing or decreasing lane detected by a sensor arranged in the mobile object, and a generating step of generating the lane information based on the traveling trajectory information and a shape of the increasing or decreasing line.

According to such a lane information generating method of the present invention, by generating the lane information based not only on the traveling trajectory information but also on the shape of the increasing or decreasing line, it is possible to complementarily use information of the shape of the increasing or decreasing line at a position where variation is easily generated in a traveling trajectory and thus to generate lane information with high accuracy.

In an increasing lane, the increasing or decreasing line is a line branching from a line which defines an existing traveling lane (a line which increases from a line defining the existing traveling lane), and in a decreasing lane, the increasing or decreasing line is a line converges on a line defining a traveling lane adjacent thereto (a line located on an outer side out of two lines getting closer to each other). Further, the lane information of the increasing or decreasing lane may be, for example, information regarding a characteristic point (a node) showing a start position or an end position of a lane change.

In the generating step, it is preferable to generate the lane information by converting a portion of a shape of the traveling trajectory of the mobile object into the shape of the increasing or decreasing line. Thereby, it is possible to generate lane information of the increasing or decreasing line with high accuracy.

It is preferable that the traveling trajectory information in of a plurality of mobile objects is acquired in the first acquiring step, and that a replaced range is determined based on the traveling trajectory information of the plurality of mobile objects in the generating step. Thereby, shapes of a plurality of traveling trajectories are replaced with the shape of the increasing or decreasing line with respect to a range in which variation is large, and the shapes of the plurality of traveling trajectories can be used intactly with respect to other ranges.

The lane information generating method may further include a third acquiring step which acquires displacement of the mobile object and a correction step to correct the traveling trajectory information based on the displacement. Thereby, it is possible to generate lane information with high accuracy by using the corrected traveling trajectory information.

On the other hand, a lane information generating system according to the present embodiment is a lane information generating system which generates the lane information of the increasing or decreasing lane which increases or decreases from the traveling lane based on the traveling trajectory information of the mobile object and includes a first acquiring unit acquiring the traveling trajectory information, a second acquiring unit acquiring the increasing or decreasing line information of the increasing or decreasing line of the increasing or decreasing lane detected by the sensor arranged in the mobile object, and a generating unit generating the lane information based on the traveling trajectory information and the shape of the increasing or decreasing line.

Further, a lane information generating device according to the present embodiment is a lane information generating device which generates the lane information of the increasing or decreasing lane which increases or decreases from the traveling lane based on the traveling trajectory information of the mobile object and includes the first acquiring unit acquiring the traveling trajectory information, the second acquiring unit acquiring the increasing or decreasing line information of the increasing or decreasing line of the increasing or decreasing lane detected by the sensor arranged in the mobile object, and a generating unit generating the lane information based on the traveling trajectory information and the shape of the increasing or decreasing line.

According to the lane information generating system and the lane information generating device of the present embodiment, as is the case with the above-mentioned lane information generating method, the lane information of the increasing or decreasing lane which increases or decreases from the traveling lane can be generated with high accuracy. Meanwhile, each configuration of the lane information generating system and the lane information generating device may be provided in one device or may be provided in each of a plurality of devices which are physically separated.

EXAMPLES

An example of the present invention will be described specifically. A lane information generating system (lane information generating device) 1 of the present example includes, as shown in FIG. 1, a current position estimating unit 2, a sensor 3, a displacement sensor 4, and a control unit 5. The current position estimating unit 2, the sensor 3, and the displacement sensor 4 are provided in a vehicle 10 as a mobile object, and the control unit 5 is provided in an external server 20 which communicates with the vehicle 10. Meanwhile, the vehicle 10 may be a general vehicle or a measuring vehicle for the purpose of generating map data.

The current position estimating unit 2 estimates a current position (absolute position) of the vehicle 10 and may be, for example, a GPS receiving unit which receives a radio wave emitted from a plurality of GPS (Global Positioning System) satellites.

The sensor 3 includes a projecting unit which projects an electromagnetic wave onto a road surface and a receiving unit which receives a reflected wave of the electromagnetic wave reflected by the road surface. The sensor 3 may be, for example, any light sensor (so-called LIDAR: Laser Imaging Detection and Ranging) which projects light and then receives reflected light reflected by an irradiation object. Further, the sensor 3 may be a camera which takes an image of the road surface. Information regarding a shape of a line formed on the road surface (a white or yellow broken line or a white or yellow solid line) can be acquired by the sensor 3. Further, a dedicated sensor 3 may be provided in order to acquire the shape of the line, or a drive recorder or a light sensor for driving assistance may be used as the sensor 3.

The displacement sensor 4 acquires displacement of the vehicle 10, and may be constituted by, for example, a vehicle speed pulse acquiring unit which acquires a vehicle speed pulse of the vehicle 10, and a gyro sensor which acquires angular velocity and angular acceleration of the vehicle 10. The displacement sensor 4 may be provided with an angular velocity sensor.

The vehicle 10 is provided with a communicating unit 11. The communicating unit 11 is constituted with a circuit or an antenna or the like to communicate with a network such as the Internet or a public line or the like, and transmits and receives information by communicating with the external server 20. Meanwhile, the communicating unit 11 may perform only a transmission of information to the external server 20.

Other than the control unit 5, the external server 20 includes a storage unit body 21 and a communication unit 22 and is provided being physically separated from the vehicle 10, and is capable of communicating with the vehicle 10 via, for example, the network such as the Internet or the like and is configured to collect and store information from the vehicle 10. Meanwhile, a state where the external server 20 is communicating with one vehicle 10 is shown in FIG. 1, however, the external server 20 is capable of communicating with a plurality of vehicles.

The control unit 5 is constituted with a CPU (Central Processing Unit) provided with a memory, for example, a RAM (Random Access Memory) or ROM (Read Only Memory), and the control unit 5 manages entire control of the external server 20, and as described later, performs a process regarding information acquired from the vehicle 10 and stores the processed information in the storage unit body 21.

The storage unit body 21 is constituted with, for example, a hard disc or a nonvolatile memory or the like, and stores the map data, and reading and writing are performed by control from the control unit 5. The map data includes route information of a road. Information on a plurality of characteristic points (nodes) is included in the route information, and the route information becomes information with respect to a route on which a vehicle can travel by connecting these characteristic points appropriately. Meanwhile, due to a configuration of the stored data, the storage unit body 21 may separately store the map data and the route information.

The communication unit 22 is constituted with a circuit or an antenna or the like to communicate with the network such as the Internet or the public line or the like, and transmits and receives the information by communicating with the vehicle 10.

In a lane information generating system 1 as mentioned above, the traveling trajectory information is generated by performing map-matching based on current position information (latitude and longitude information) acquired by the current position estimating unit 2 and the route information stored in the storage unit body 21. At this time, the map-matching may be performed on the vehicle 10 side and a result thereof may be acquired by the control unit 5 of the external server 20, or the control unit 5 may acquire the current position information and perform the map-matching and acquire the traveling trajectory information. Thus, the control unit 5 acquires the traveling trajectory information (first acquiring step) and functions as a first acquiring unit. Meanwhile, the control unit 5 may generate the traveling trajectory information based only on the latitude and longitude information without performing the map-matching.

Figure 2:
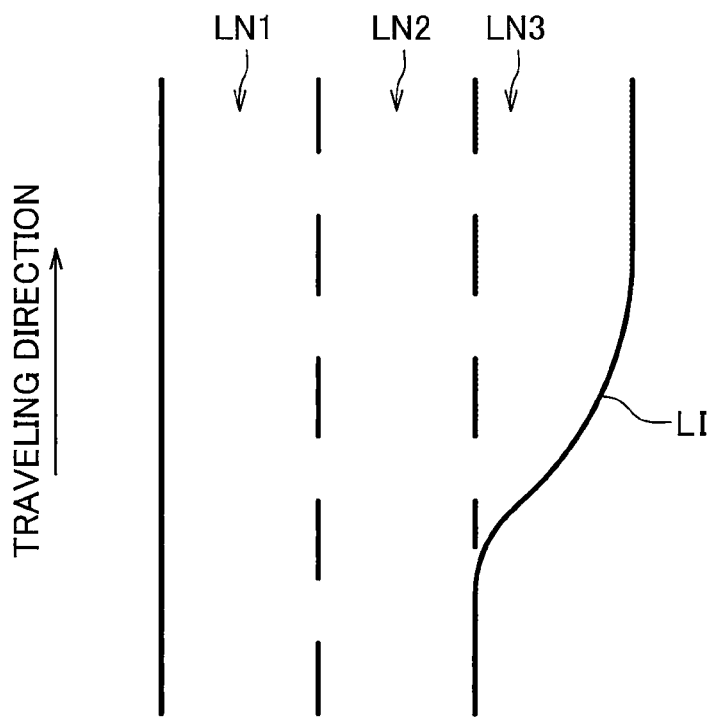
FIG. 2 is a plan view illustrating one example of a road with respect to which lane information is generated by the lane information generating system.

The lane information generating system 1 determines a plurality of characteristic points with respect to each lane of a road on which the vehicle 10 travels, on based on the acquired traveling trajectory information. Meanwhile, in the present example, it is assumed that the vehicle travels on the left side, but the lane information generating system 1 is also applicable to countries or regions where vehicles travel on the right side. Below, a method to generate lane information of an increasing lane LN3 by determining a characteristic point on the increasing lane LN3 in a case where the increasing lane (lane only for a right turn) LN3 which increases from two traveling lanes LN1 and LN2 before an intersection exists as shown in FIG. 2 is described.

In a case where the vehicle 10 turns right at the intersection, the control unit 5 acquires the current position information of a section from a lane change from a traveling lane LN2 to an increasing lane LN3 to entering to a lane after turning right. Thereby, the control unit 5 generates a traveling trajectory. Meanwhile, whether the traveling lane LN3 exists or not may be judged using information previously stored in the storage unit body 21 or the like or based on an acquired result of the sensor 3.

Figure 3:
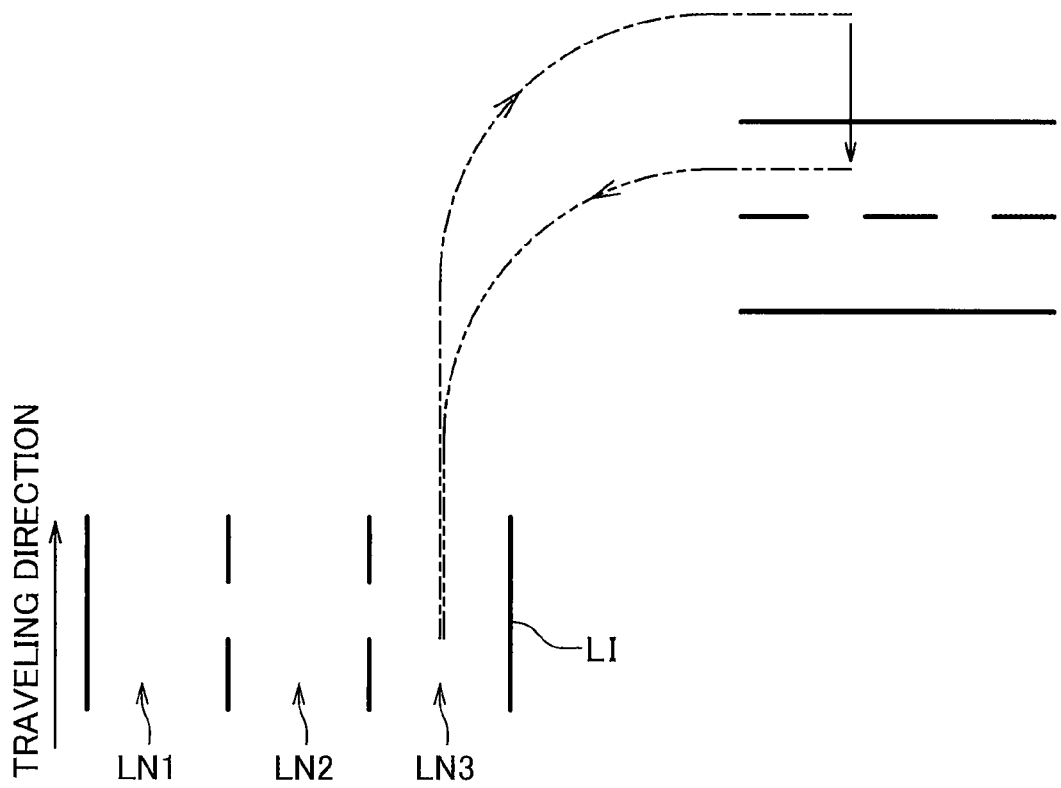
FIG. 3 is a plan view illustrating a traveling trajectory in a case where a mobile object turns right on the road.

When the traveling trajectory is generated based on the current position information as described above, a smooth curve may not be obtained at a position corresponding to the turning right process. Therefore, the traveling trajectory may be generated by integrating displacements obtained by the displacement sensor 4 with a predetermined position set as reference, and in such a case, a smooth curve can be obtained. Since the displacement includes an error and errors are cumulated due to the integration, as shown by a dot-dashed line in FIG. 3, the traveling trajectory generated based on the displacement may diverge from the lane after turning right at a position where turning right is completed.

In such a case, the control unit 5 may obtain a displacement of the vehicle 10 in this section from the displacement sensor 4 (third acquiring step), and may generate the traveling trajectory by cumulating the displacements from a position on the lane after turning right as a starting point (shown in the drawing by a two-dot chain line). That is, the control unit 5 corrects the traveling trajectory information based on the displacement of the vehicle 10 (correction step). Meanwhile, the traveling trajectory information may be corrected by integrating the displacements toward an opposite direction of a traveling direction from the position on the lane after turning right to, for example, an end position of the traveling lane LN3 (that is, a start position of turning right). Further, the traveling trajectory may be corrected by integrating the displacements in the traveling direction from the end position of the traveling lane LN3 set as a starting point.

Figure 4:
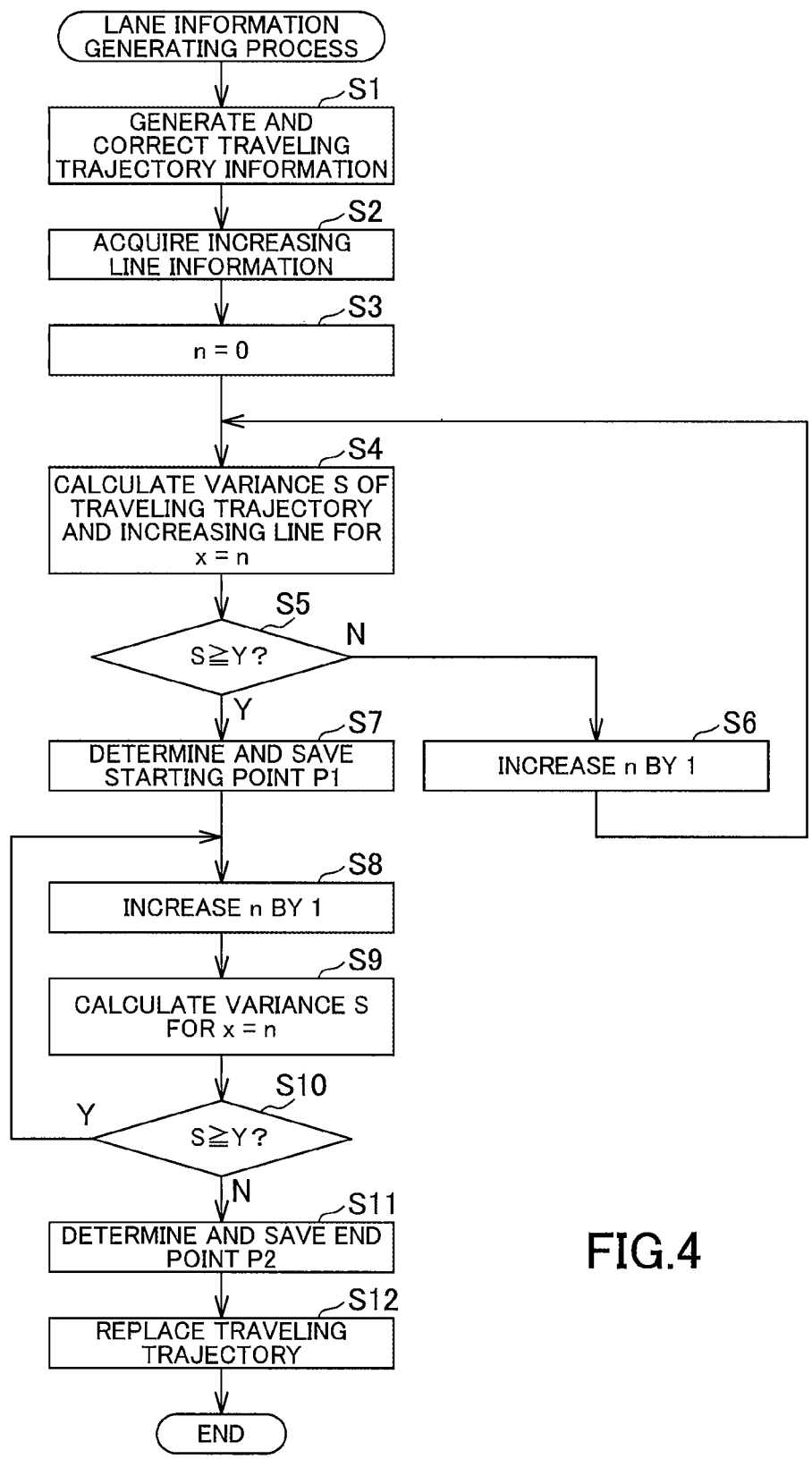
FIG. 4 is a flowchart showing one example of a lane information generating process performed by the lane information generating system.

Next, the control unit 5 performs a lane information generating process shown in FIG. 4. First, the control unit 5 acquires the current position information from a plurality of vehicles and generates the traveling trajectory information and corrects the traveling trajectory information based on the displacement (step S1) as described above. Then, the control unit 5 acquires information (increasing line information) regarding a position and a shape of an increasing line LI of the increasing lane LN3 based on a detected result of the sensor 3 (step S2, second acquiring step). Meanwhile, the increasing line LI is a line to define the increasing lane LN3 and is branched from a line on a right side out of two lines defining the existing traveling lane LN2.

Then, with n=0 (step S3), in a traveling direction position (x=n), the control unit 5 calculates variance S of a distance between each of a plurality of traveling trajectories and the increasing line LI (step S4) and judges whether the calculated variance S is equal to or greater than a threshold Y or not (step S5). If the variance S is less than the threshold Y (Judged N in step S5), the control unit 5 increments n by 1 (step S6), and then returns to the step S4.

If the variance S is equal to or greater than the threshold Y (Judged Y in step S5), the control unit 5 determines and stores the traveling direction position as a starting point P1 (step S7). Then, the control unit 5 increments n by 1 (step S8) and calculates the variance S for x=n (step S9), and judges whether the calculated variance S is equal to or greater than the threshold Y or not (step S10). If the variance S is equal to or greater than the threshold Y (Judged Y in step S10), the control unit 5 returns to the step 8. If the variance S is less than the threshold Y (Judged N in step S10), the control unit 5 determines and stores the traveling direction position as an end point P2 (step S11).

The control unit 5 replaces the traveling trajectory with the shape of the increasing line LI (step S12) between the starting point P1 and the end point P2 and completes the process. Meanwhile, here, as the traveling trajectory, one representative traveling trajectory may be used, or an average of the plurality of traveling trajectories may also be used. In the step 12, a section between the starting point P1 and the end point P2 is deleted from the traveling trajectory, and a line which is the increasing line LI translated in a direction orthogonal to the traveling direction is connected to the traveling trajectory at the starting point P1 and the end point P2. This line after replacement is a composite line.

Figure 5:
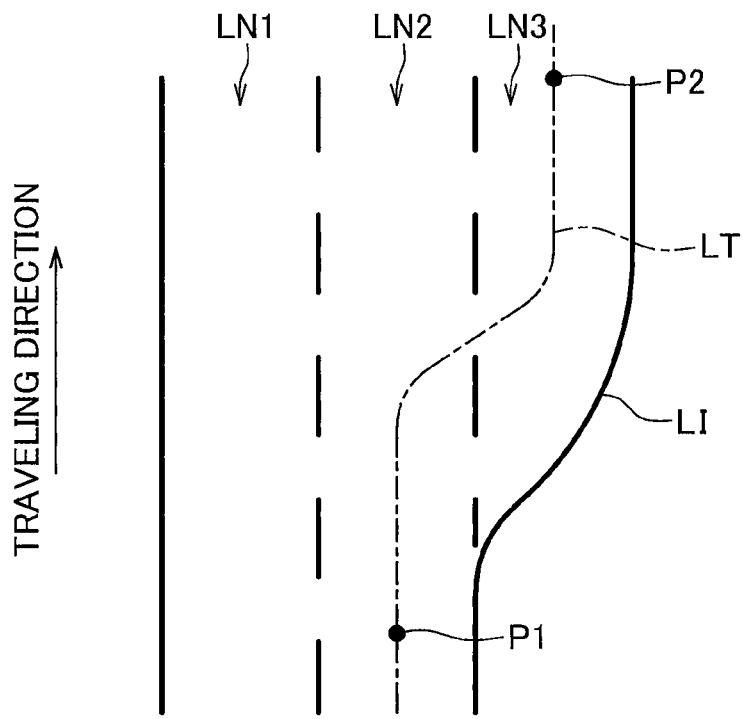
FIG. 5 is a plan view illustrating traveling trajectory information in an increasing lane of the road.
Figure 6:
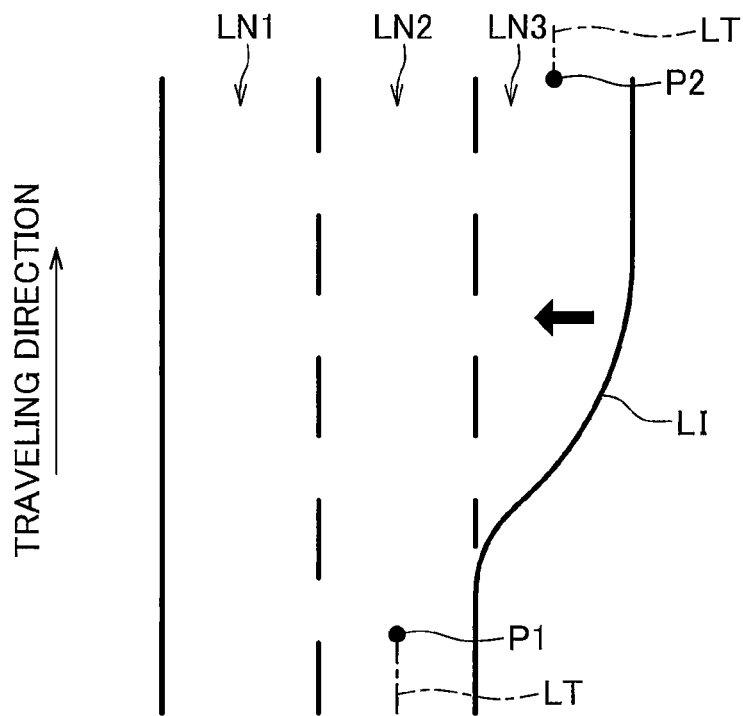
FIG. 6 is a plan view illustrating a state in which a portion of the traveling trajectory information is removed.
Figure 7:
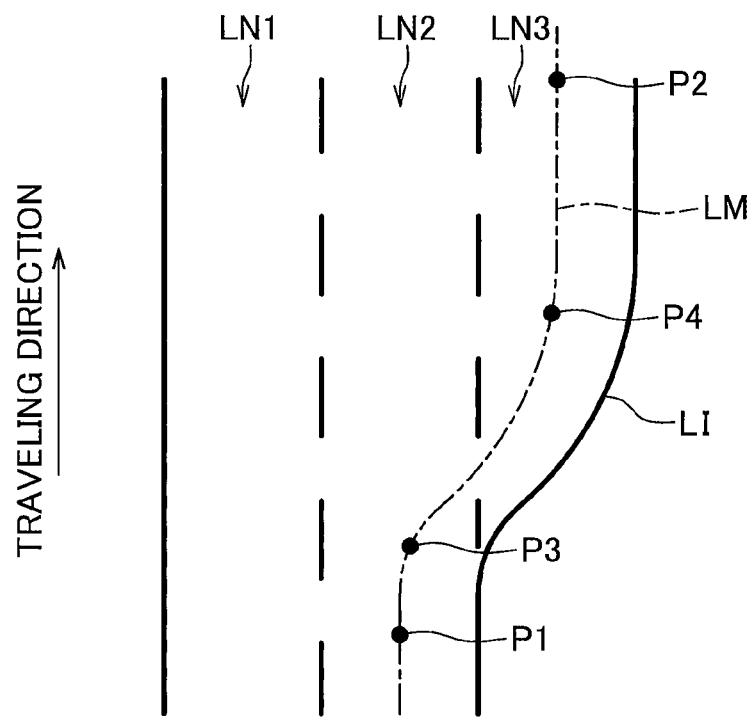
FIG. 7 is a plan view illustrating a state in which a portion of the traveling trajectory information is replaced with a shape of an increasing line.

The above-mentioned lane information generating process will be described specifically based on FIGS. 5 to 7. First, in the step S1, a traveling trajectory LT as shown in FIG. 5 is obtained by generating and correcting the traveling trajectory. Meanwhile, in FIG. 5, for ease of explanation, only one traveling trajectory is illustrated. Further, the starting point P1 and the end point P2 are determined by calculating the variance S and comparing the variance S with a threshold in the steps S3 to S11. Further, as shown in FIGS. 6 and 7, a composite line LM is generated by replacing the traveling trajectory LT with the shape of the increasing line LI in the step S12.

By generating the composite line LM as mentioned above, the control unit 5 can determine representative points on the composite line LM as characteristic points P3 and P4. Each of the characteristic points P3 and P4 shows a start position and an end position of a lane change, and is lane information of an increasing lane L3. The control unit 5 stores information regarding the characteristic points P3 and P4 in the storage unit body 21 of the external server 20. At this time, at the intersection, characteristic points may be determined also on an opposite lane. Therefore, in order not to make the characteristic points P3 and P4 connected to the characteristic points of the opposite lane, it is preferable to store not only the position information of the characteristic points P3 and P4 but also information together on which characteristic points the characteristic points P3 and P4 are connected.

According to the above-mentioned configuration, by determining the characteristic points P3 and P4 based not only on the traveling trajectory information but also on the shape of the increasing line LI, information of the shape of the increasing line LI at a position at which variation is easily generated in the traveling trajectory can be complementarily used to generate the characteristic points P3 and P4 as lane information of the increasing line LI with high accuracy.

Further, it is possible to generate the lane information of the increasing line LI with high accuracy by converting the shape of the traveling trajectory into the shape of the increasing line LI between the starting point P1 and the end point P2.

In addition, by determining the starting point P1 and the end point P2 which show a replaced range based on the traveling trajectory information on the plurality of vehicles, shapes of the plurality of traveling trajectories are replaced with the shape of the increasing or decreasing line with respect to a range in which the variation is large, and the shapes of the plurality of traveling trajectories can be used intactly with respect to other ranges.

By correcting the traveling trajectory information based on the displacement acquired by the displacement sensor 4, the lane information can be generated with high accuracy using the corrected traveling trajectory information.

The present invention is not limited to the example explained above, but the invention includes other configurations or the like which can achieve the object of the invention, and the following modifications are also included in the invention.

Figure 8:
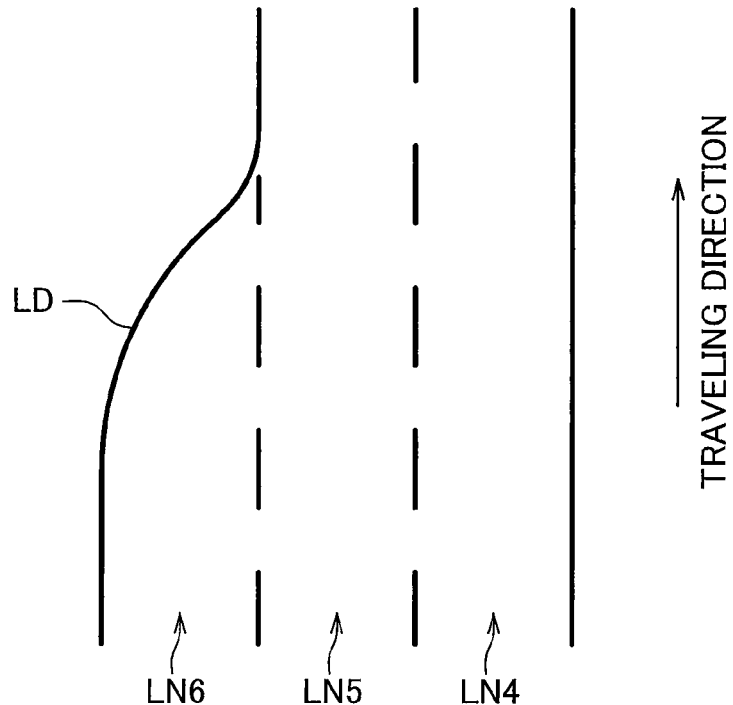
FIG. 8 is a plan view illustrating another example of a road with respect to which lane information is generated by the lane information generating system.

For example, in the above-mentioned example, the lane information regarding the increasing lane L3 only for a right turn is generated, but lane information about an increasing lane only for a left turn may also be generated. Further, as shown in FIG. 8, in a case where the number of lanes decreases from three to two, a disappearing lane may be a decreasing lane LN6, and remaining lanes may be traveling lanes LN4 and LN5, and lane information of the decreasing lane LN6 may be generated based on the traveling trajectory information and a shape of a decreasing line LD of the decreasing lane LN6. Meanwhile, the decreasing line LD is a line to define the decreasing lane LN6 and converges on a line located on a left side out of two lines defining an adjacent traveling lane LN5.

Further, in the above-mentioned example, the replaced range is determined based on the traveling trajectory information on the plurality of vehicles, but the replaced range of the traveling trajectory may be determined by another method. For example, a branching start position of the increasing line LI may be detected by a sensor 4 and then the traveling direction position corresponding to this branching start position may also be a start point of the replaced range. Further, an end position of the increasing line L3 and a stop line position may be detected by the sensor 4 and then the traveling direction position corresponding to this end position or the stop line position may also be an end point of the replaced range.

Further, in the above-mentioned example, the composite line LM is generated by replacing a portion of the shape of the traveling trajectory with the shape of the increasing line LI, but it is sufficient to use the shape of the increasing line LI when the lane information is generated, and the portion of the shape of the traveling trajectory need not to be converted. For example, the composite line may be generated by an average of the shape of the traveling trajectory and the shape of the increasing line LI.

Further, in the above-mentioned example, the traveling trajectory information is corrected based on the displacement acquired by the displacement sensor 4, but, for example, in a case where the traveling trajectory information generated based on the current position information becomes a smooth curve, correction based on the displacement needs not to be performed.

Although the best configuration and method and the like for carrying out the present invention have been described above, the invention is not limited to them. That is, the invention is particularly illustrated and described mainly with reference to the specific example, but a person skilled in the art can variously modify the above-described example in terms of shapes, materials, the amount and other detailed configurations without departing the scopes of the technical idea and purposes of the present invention. Therefore, the descriptions limited to the above-disclosed shapes and materials etc. are illustratively described to make it easy to understand the present invention, and they do not limit the invention. Thus, descriptions with names of members from which a portion or all of the limitations such as the shapes and the materials are removed are included in the invention.

REFERENCE SIGNS LIST 1 lane information generating system (lane information generating device)
2 current position estimating unit
3 sensor
5 control unit (first acquiring unit, second acquiring unit, generating unit)
LN3 increasing lane
LI increasing line

The invention claimed is:
1. A computer-implemented lane information generating method for generating lane information of an increasing or decreasing lane which increases or decreases from a traveling lane of a road on which a mobile object travels along a traveling trajectory, the method comprising:
acquiring current position information from a current position estimating unit (2);
acquiring traveling trajectory information of the traveling trajectory of the mobile object, based on the current position information acquired by the current position estimating unit (2) and from route information stored in a storage unit body (21);

acquiring information of a position and a shape of an increasing or decreasing line of the increasing or decreasing lane from sensor information detected by a sensor arranged in the mobile object, wherein a starting point of the increasing or decreasing lane and an ending point of the increasing or decreasing lane are determined based on one of the traveling trajectory information and the sensor information; and generating the lane information based on the traveling trajectory information and the shape of the increasing or decreasing line, wherein the lane information is generated by replacing a portion of a shape of the traveling trajectory, from the starting point to the ending point, with the shape acquired of the increasing or decreasing line.

2. The lane information generating method according to claim 1, wherein traveling trajectory information is acquired for a plurality of the mobile objects, and wherein a range of the portion of the shape of the traveling trajectory replaced with the shape of the increasing or decreasing line in the generating step is determined based on the traveling trajectory information for the plurality of mobile objects.

3. The lane information generating method according to claim 2, further comprising:

acquiring a displacement of the mobile object; and correcting the traveling trajectory information based on the displacement.

4. The lane information generating method according to claim 1, further comprising:

acquiring a displacement of the mobile object; and correcting the traveling trajectory information based on the displacement.

5. An apparatus for a mobile object that generates lane information of an increasing or decreasing lane which increases or decreases from a traveling lane of a road on which a mobile object travels, comprising:

a control unit, constituted with a central processing unit and a memory, and in communication with a storage unit body (21);

a current position estimating unit (2) that generates current position information of the mobile object;

a sensor (3); and a displacement sensor (4);

the sensor (3) configured to detect a line formed on a surface of the road on which the mobile object travels and acquire shape information regarding said line, the displacement sensor (4) configured to determine a displacement of the mobile object, and the control unit (5) configured to:

acquire the current position information from the current position estimating unit (2), acquire traveling trajectory information of a traveling trajectory of the mobile object, based on the current position information acquired by the current position estimating unit (2) and from route information stored in the storage unit body (21), acquire information of a position and a shape of an increasing or decreasing line of the increasing or decreasing lane from sensor information detected by the sensor arranged in the mobile object, wherein a starting point of the increasing or decreasing lane and an ending point of the increasing or decreasing lane are determined based on one of the traveling trajectory information and the sensor information, and generate the lane information based on the traveling trajectory information and the shape of the increasing or decreasing line wherein the lane information is generated by replacing a portion of a shape of the traveling trajectory, from the starting point to the ending point, with the shape acquired of the increasing or decreasing line.

* * * * *